US012785607B2

(12) United States Patent
Nie et al.

(10) Patent No.: US 12,785,607 B2
(45) Date of Patent: Nov. 3, 2026

(54) METHOD AND SYSTEM FOR PULSED OPERATION OF AN INDUCTION ELECTRIC MACHINE

(71) Applicant: Ford Global Technologies, LLC, Dearborn, MI (US)

(72) Inventors: Yue Nie, Ann Arbor, MI (US); Chris Wolf, Ann Arbor, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 18/418,875

(22) Filed: Jan. 22, 2024

(65) Prior Publication Data

US 2025/0239956 A1 Jul. 24, 2025

(51) Int. Cl.
*H02P 27/12* (2006.01)
*B60L 15/20* (2006.01)
*H02P 21/22* (2016.01)

(52) U.S. Cl.
CPC .......... *H02P 27/12* (2013.01); *B60L 15/2045* (2013.01); *H02P 21/22* (2016.02); *B60L 2220/12* (2013.01); *B60L 2240/423* (2013.01); *B60L 2240/429* (2013.01); *H02P 2207/01* (2013.01)

(58) Field of Classification Search
CPC ...... H02P 27/12; H02P 21/22; H02P 2207/01; B60L 15/2045; B60L 2220/12; B60L 2240/423; B60L 2240/429
See application file for complete search history.

(56) References Cited

U.S. PATENT DOCUMENTS

| | | | | |
|---|---|---|---|---|
| 11,167,648 B1 | | 11/2021 | Carvell et al. | |
| 11,628,730 B2 | | 4/2023 | Srinivasan | |
| 11,682,992 B2 | | 6/2023 | Takahashi et al. | |
| 2007/0139852 A1 | * | 6/2007 | Reuter | H01F 7/16 361/160 |
| 2009/0315492 A1 | * | 12/2009 | Oomura | H02P 6/20 318/400.11 |
| 2010/0110594 A1 | * | 5/2010 | Walters | B60L 15/025 903/930 |
| 2019/0207544 A1 | * | 7/2019 | Sumita | B66B 1/30 |
| 2020/0212834 A1 | | 7/2020 | Mazda et al. | |
| 2020/0313586 A1 | * | 10/2020 | Gopalakrishnan | B60L 50/60 |
| 2022/0134890 A1 | * | 5/2022 | Nakao | B60L 15/20 318/34 |
| 2022/0223937 A1 | * | 7/2022 | Xu | B60L 50/60 |

FOREIGN PATENT DOCUMENTS

KR 20230050188 A * 4/2023 ............. H02P 21/22

OTHER PUBLICATIONS

Translation of KR20230050188A has been attached.*

* cited by examiner

*Primary Examiner* — Zoheb S Imtiaz
(74) *Attorney, Agent, or Firm* — McCoy Russell LLP

(57) ABSTRACT

Systems and methods for commanding an electric drive system for an electric or hybrid vehicle are described. In one example, the drive system is commanded by a controller that supplies different D-axis and Q axis command signals. The different D-axis and Q-axis command signals permit adjustments to alter vehicle noise and vibration levels.

20 Claims, 14 Drawing Sheets

METHOD AND SYSTEM FOR PULSED OPERATION OF AN INDUCTION ELECTRIC MACHINE

FIELD

The present description relates to methods and a system for operating an induction electric machine.

BACKGROUND/SUMMARY

Customer acceptance and satisfaction of electric vehicles may not be as high as may be desired due to customers experiencing range anxiety. In particular, a customer may become anxious that their vehicle may not have a capacity to reach a charging station before being empty of charge. One way to increase vehicle range may be to increase size of the vehicle's electric energy storage device. However, vehicle mass may increase with increasing a charge storage capacity of an electric energy storage device and vehicle efficiency may decrease with increased vehicle mass. Therefore, it may be desirable to increase a distance that a vehicle may travel without having to increase electric energy storage device charge capacity.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
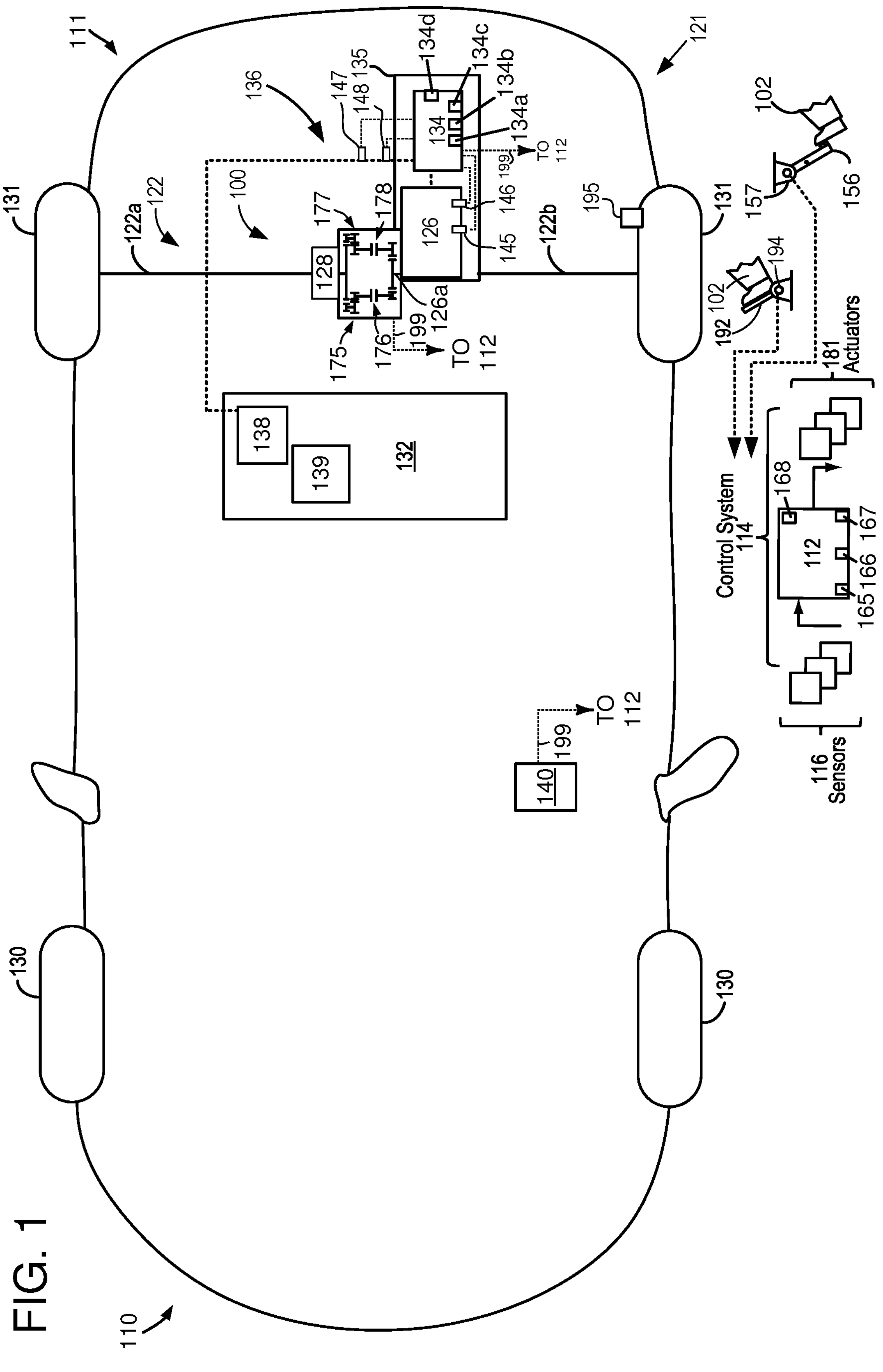
FIG. 1 is a schematic diagram of a vehicle that includes an electric machine for propulsion.
Figure 6:
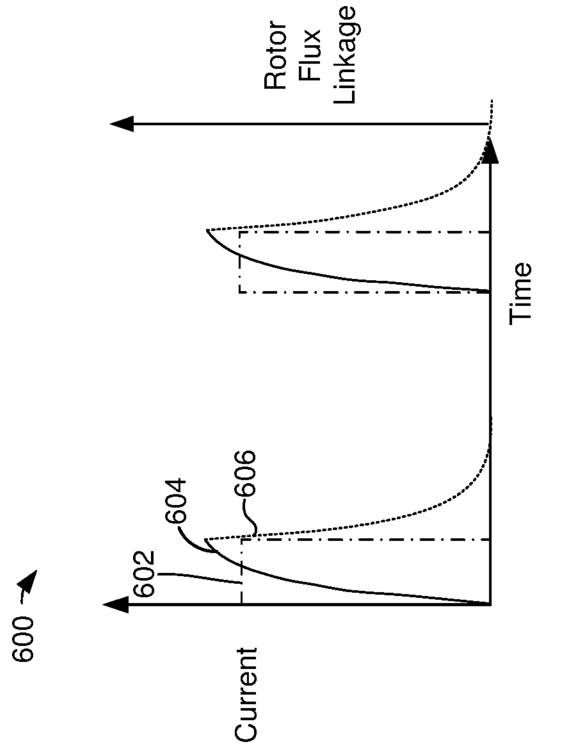
Figure 7:
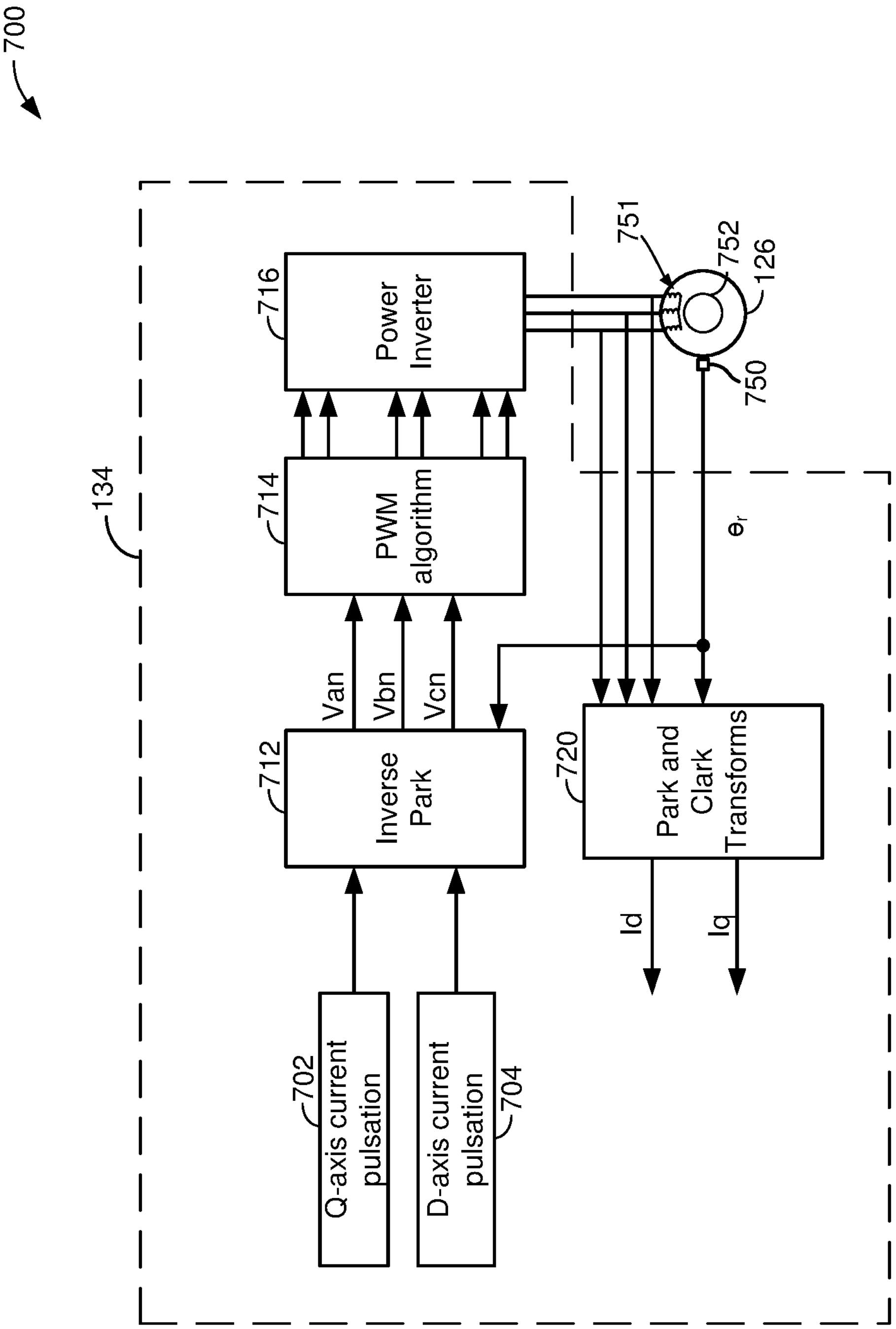
FIG. 7 shows a block diagram of an electric machine controller.
Figure 20:
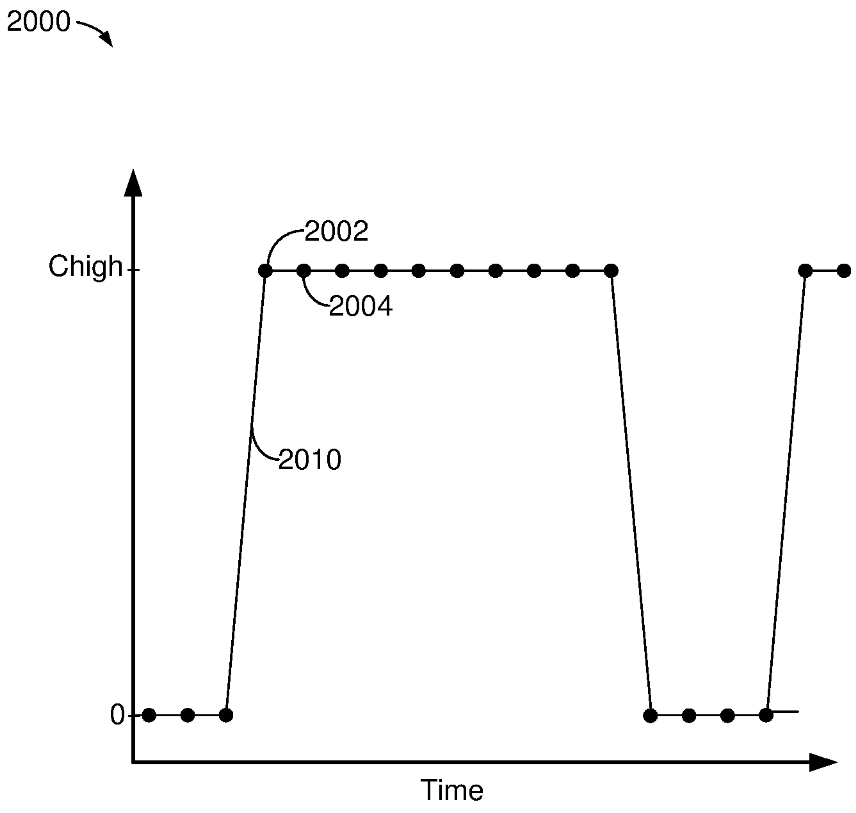
FIG. 20 shows details of a pulsed signal.
Figure 21:
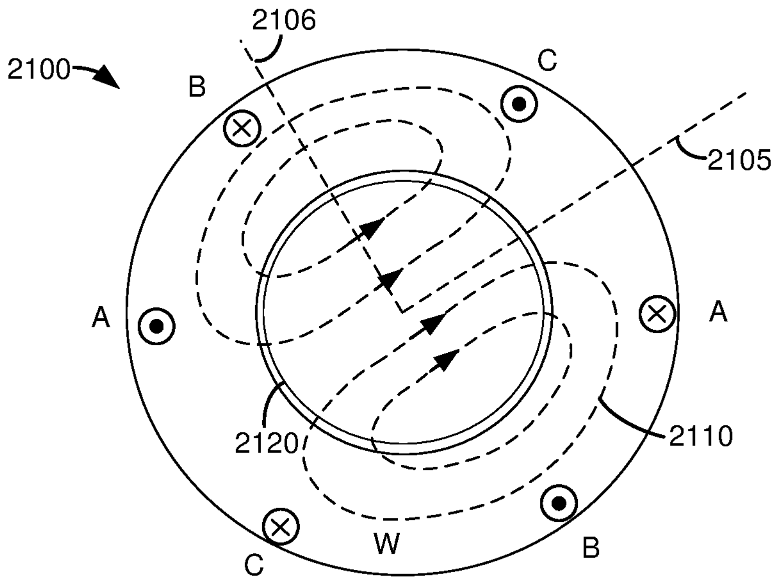
FIG. 21 shows a plot of example D and Q axes.

The present description is related to increasing efficiency of an electric drive system that includes an induction electric machine. The efficiency of the electric drive system may be increased by commanding the electric drive system via a pulsed D and Q axis command signals. The pulsed command signals may be phase shifted with respect to each other to reduce vehicle noise and vibration. Further, the pulsed command signals may be adjusted responsive to magnetic flux of an electric machine so as to leverage residual magnetic flux. The pulsed command signals may be applied in a vehicle of the type that is shown in FIG. 1. Conditions that an electric machine may operate under are shown in the plots of FIGS. 2A-6. A block diagram of an example electric machine controller is shown in FIG. 7. D-axis (direct axis) and Q-axis (quadrature axis) currents and flowcharts for several different control variations are shown in FIGS. 8-19. A plot of a pulsed signal is shown in FIG. 20. D-axis and Q-axis are shown in FIG. 21.

Extending a distance that a vehicle may be driven on charge stored in an electric energy storage device may also be desirable for at least the reason that the vehicle may have to be charged less frequently. Further, increasing efficiency of an electric machine that consumes electric power from the electric energy storage device may help to alleviate at least some driver's range anxiety. Therefore, it may be desirable to increase an efficiency of an electric machine that consumes electric power that is stored in an electric energy storage device. One way to increase efficiency of an electric machine at some speeds and loads may be to pulse a torque that is requested of an electric machine (e.g., a motor). However, pulsing torque of an electric machine may increase vehicle noise and vibration.

The inventors herein have recognized the above-mentioned issues and have developed a method for operating an electric drive system, comprising: supplying a pulsed magnetic flux current command signal and a pulsed torque current command signal to an electric machine controller, where the pulsed magnetic flux current command signal has timing different from the pulsed torque current command signal.

By generating pulsed magnetic flux current command signals and pulsed torque current command signals, it may be possible to reduce losses of an electric drive system while maintaining a lower level of noise and vibration as compared to operating the electric drive system based on a pulsed torque command that does not include pulsed magnetic flux current command signals with timing that is different from pulsed torque current command signals.

The present description may provide several advantages. In particular, the approach may provide smoother torque generation and lowered electric drive system losses. Further, the approach may reduce torque ripple and radial electromagnetic forces in the electric machine. Further still, the approach may provide finer tuning of amounts of torque that may be generated by the electric machine.

The above advantages and other advantages, and features of the present description will be readily apparent from the following Detailed Description when taken alone or in connection with the accompanying drawings.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system

100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122*a*, and second half shaft 122*b*. Vehicle propulsion system 100 further has front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126*a* of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122*a* and to second half shaft 122*b*. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle slowing via a human operator 102, or an autonomous controller. For example, control system 114 may receive sensory feedback from caliper application pedal position sensor 157 which communicates with caliper application pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134. Inverter system controller includes a microcontroller 134*a*, non-transitory memory 134*b*, digital inputs/outputs 134*c*, and random access memory 134*d*.

Thus, the system of FIG. 1 provides for a system, comprising: an electric drive system including an inverter and an electric machine; and one or more controllers including executable instructions stored in non-transitory memory that cause the controller to generate a pulsed magnetic flux current command signal and a pulsed torque current command signal, where a duration of the pulsed magnetic flux current command signal is shorter than a duration of the pulsed torque current command. In a first example, the system includes where the pulsed magnetic flux current command signal is zero during a portion of a period of the pulsed magnetic flux current command signal. In a second example that may include the first example, the system includes where the pulsed torque current command signal is zero during a portion of a period of the pulsed torque current command signal. In a third example that may include one or both of the first and second examples, the system includes where an amplitude of the pulsed magnetic flux current command signal is greater than an amplitude of the pulsed torque current command signal. In a fourth example that may include one or more of the first through third examples, the system further comprises additional instructions to generate a second pulsed torque current command signal during a period of the pulsed torque current command signal. In a fifth example that may include one or more of the first through fourth examples, the system includes where the second pulsed torque current command signal is delivered to or generated by the one or more controllers when the pulsed magnetic flux current command signal is a value of zero. In a sixth example that may include one or more of the first through fifth examples, the system further comprises supplying electric current to an induction machine in response to the pulsed magnetic flux current command signal and the pulsed torque current command signal.

Figure 2A:
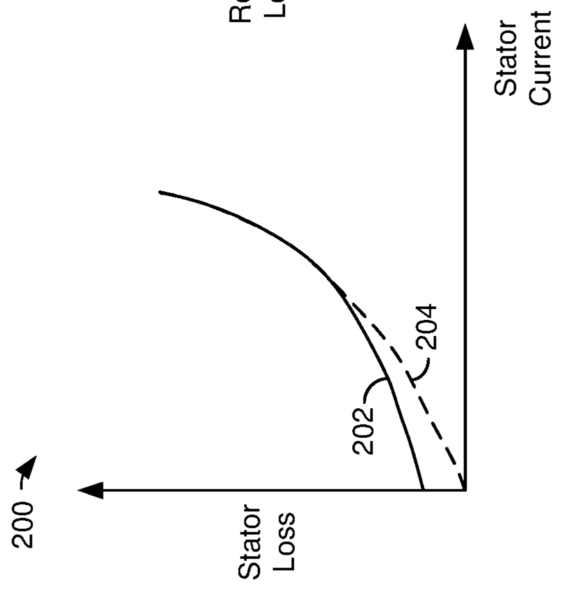
FIGS. 2A-6 show plots that illustrate electric machine operation.

Referring now to FIG. 2A, a plot 200 of electric machine stator losses versus electric machine stator electric current is shown. The vertical axis of plot 200 represents electric machine stator losses and electric machine stator losses increase in the direction of the vertical axis arrow. The horizontal axis represents electric machine stator electric current and current increases from the left side of the plot to the right side of the plot. Solid line trace 202 represents stator losses when continuous current is applied to provide a driver demand torque and dashed line 204 represents stator losses when pulsed current is applied to provide a same driver demand torque. Thus, it may be observed that at lower stator electric currents, stator losses may be reduced by applying pulsed electric current to an electric machine.

Figure 2B:
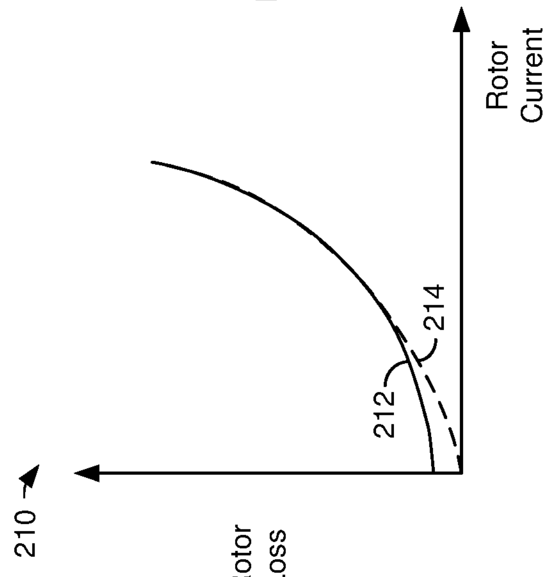

Referring now to FIG. 2B, a plot 210 of electric machine rotor losses versus electric machine rotor electric current is shown. The vertical axis of plot 210 represents electric machine rotor losses and electric machine rotor losses increase in the direction of the vertical axis arrow. The horizontal axis represents electric machine rotor electric current and current increases from the left side of the plot to the right side of the plot. Solid line trace 212 represents rotor losses when continuous current is applied to provide a driver demand torque and dashed line 214 represents rotor losses when pulsed current is applied to provide a same driver demand torque. Thus, it may be observed that at lower rotor electric currents, rotor losses may be reduced by applying pulsed electric current to an electric machine.

Figure 2C:
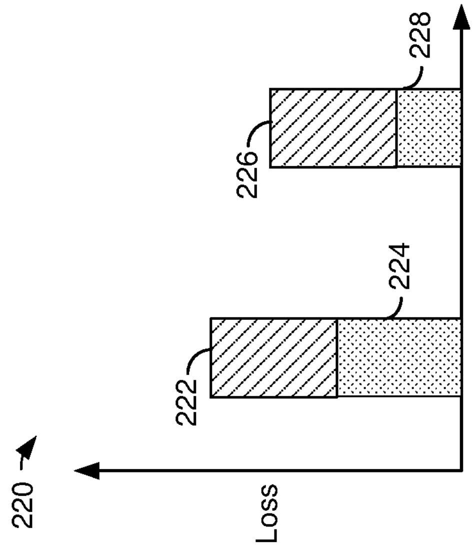

Referring now to FIG. 2C, a bar plot 220 of electric machine rotor losses and stator losses for continuous electric current and pulsed electric current is shown. The vertical axis of plot 220 represents electric machine losses and electric machine losses increase in the direction of the vertical axis arrow. Bar 222 represents electric machine rotor losses when constant D-axis current and Q-axis current is requested. Bar 224 represents electric machine stator losses when constant D-axis current and Q-axis current is requested to provide a constant torque. Bar 226 represents electric machine rotor losses when pulsed D-axis current and Q-axis current is requested to provide the constant torque. Bar 228 represents electric machine stator losses when pulsed D-axis current and Q-axis current is requested to provide the same constant torque. Thus, it may be observed that losses for an electric machine rotor and an electric machine stator may be manipulated via applying pulsed electric machine electric currents to provide the same constant torque.

Figure 4:
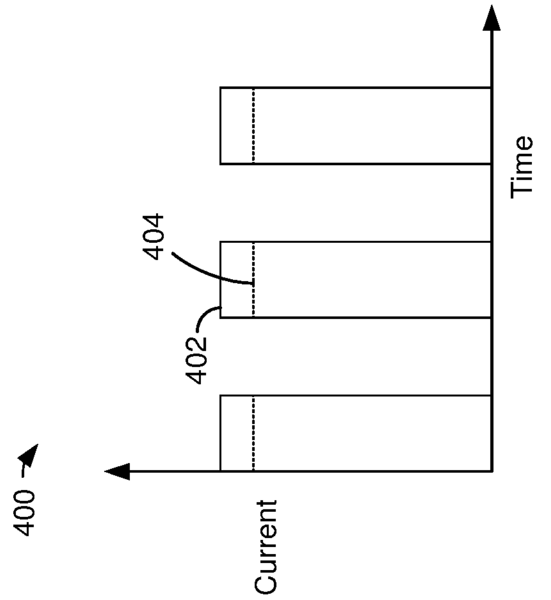
Figure 3:
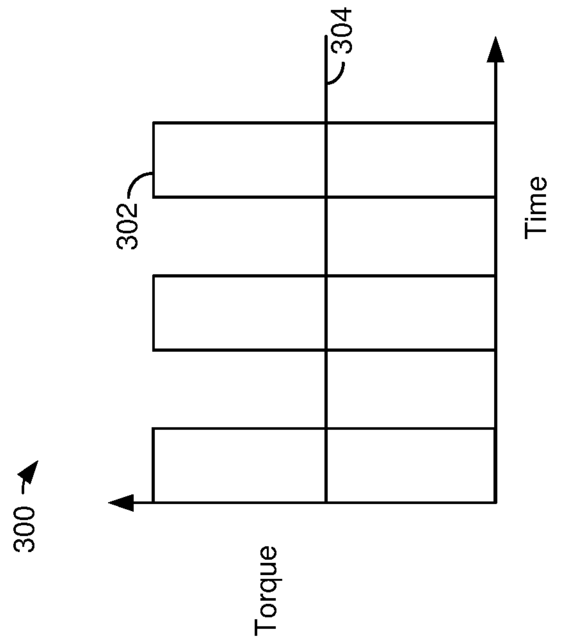

Referring now to FIG. 3, a plot 300 of an example where a pulsed torque command is applied to generate a desired average electric machine torque is shown. The vertical axis represents electric machine torque and electric machine torque increases in the direction of the vertical axis arrow. The horizontal axis represents time and time increases from the left side of the plot to the right side of the plot. In this example, electric machine torque is requested by supplying a series of torque pulses 302. The series of torque pulses 302 causes the electric machine to generate an average torque as indicated by line 304 that is less than the peak values of torque pulses 302 and greater than zero. The torque pulses 302 shown in FIG. 3 cause an electric machine controller to generate D-axis currents requests or commands as indicated by solid line 402 in FIG. 4. The torque pulses 302 shown in FIG. 3 also cause an electric machine controller to generate Q-axis currents requests or commands as indicated by dashed line 404 in FIG. 4. The timings of the D-axis current requests and Q-axis current requests shown in FIG. 4 are the same such that there is zero phase difference between the D-axis current requests and the Q-axis current requests. While this may be suitable for some electric machines, it may not be optimal for an induction electric machine. In particular, as D-axis current is pulsating between zero and a non-zero value, the rotor magnetic flux will fluctuate. If the D-axis current is non-zero, magnetic flux will be induced in the rotor bars or windings. When the D-axis current subsequently reaches zero, the residual magnetic flux will begin to decay, but it does not instantaneously reach zero. The extent of decay depends on the induction machine parameters and D-axis current pulsation properties, and it may either decay only slightly or completely decay to zero and remain at zero for a certain amount of time. Nevertheless, both situations offer the potential to utilize the residual flux for torque generation through current pulsation modifications. In particular, the inventors herein have determined that during the magnetic flux decay period, torque may be generated by applying or requesting a Q-axis or torque current while the D-axis or magnetic flux current is zero. Thus, the residual magnetic flux may be utilized to generate torque via the electric machine.

Figure 5:
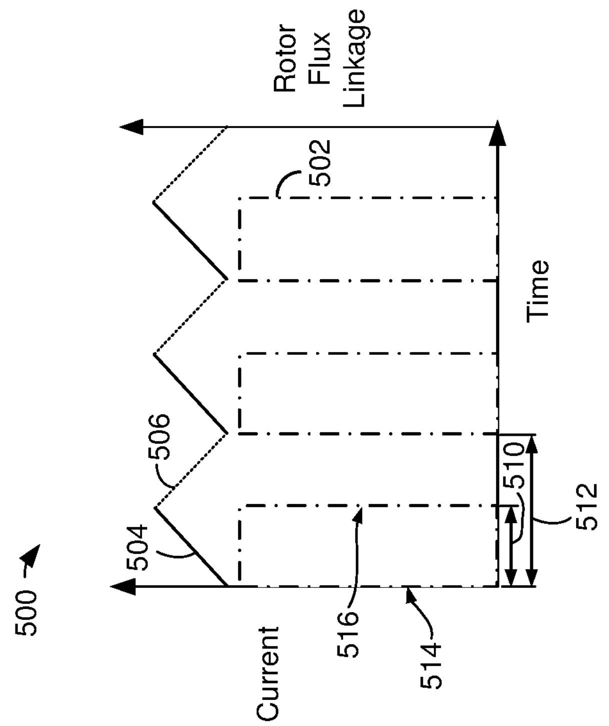

Referring now to FIG. 5, a plot 500 that illustrates a relationship between D-axis current and rotor magnetic flux linkage is shown. The left vertical axis represents D-axis current and the magnitude of D-axis current increases in the direction of the left vertical axis arrow. The right vertical axis represents electric machine rotor magnetic flux linkage and the magnitude of the electric machine rotor magnetic flux linkage increases in the direction of the right vertical axis arrow. The horizontal axis represents time and time increases from the left side of the plot to the right side of the plot. Dashed-dot line 502 represents D-axis current. Solid line 504 represents induced magnetic flux generated from the D-axis current. Dashed line 506 represents residual magnetic flux (e.g., magnetic flux linkage that is remaining in the rotor when the electric current isn't induced in the rotor).

The D-axis current generates rotor flux linkage and the Q-axis current generates electric machine torque. The control of rotor flux linkage and torque may be decoupled by separately controlling the D-axis and Q-axis currents. The calibration of a controller for an induction machine may involves determining D-axis and Q-axis current commands as well as slip gains at each steady state torque and speed operating condition. However, when a pulsating torque between zero and a nonzero steady state value is commanded, the D-axis and Q-axis currents may pulsate simultaneously based on the current calibrations. Synchronized torque and current pulsations may not be optimal for induction machines. In particular, as the D-axis current is pulsating between zero and a non-zero value, the rotor magnetic flux will fluctuate as shown in FIG. 5. If the D-axis current is non-zero, magnetic flux will be induced in the rotor bars or windings. When the D-axis current subsequently reaches zero, the residual magnetic flux will begin to decay, but it does not instantaneously reach zero. The extent of decay depends on the induction machine parameters and D-axis current pulsation properties. The magnetic flux may either decay only slightly or completely decay to zero and remain at zero for a certain amount of time. Nevertheless, both situations offer the potential to utilize the residual magnetic flux for torque generation through current pulsation modifications, thereby enabling finer adjustments to electric machine torque which may be beneficial to reduce electric machine noise and vibration.

In FIG. 5, the frequency and the duty cycle of the D-axis current is such that the residual magnetic flux does not reach zero before the D-axis current is supplied again. On the other hand, plot 600 of FIG. 6 shows D-axis current (dash-dot line 602) being supplied at a lower frequency and duty cycle where the induced magnetic flux (solid line 604) increases until the D-axis current ceases, then the residual magnetic flux (dashed line 606) decays from the level of the induced magnetic flux to a value of zero. The period of D-axis current is indicated by arrow 512 and the duty cycle of the pulsed D-axis current is indicated by arrow 510. The periods and duty cycles of other pulsed signals described herein are similar to those shown in FIG. 5. The rising edge of the D-axis current is indicated at 514. The falling edge of the D-axis current is indicated at 516. The rising and falling edges of other D-axis and Q-axis signals shown and/or described herein may follow the similar trajectories as shown at 514 and 516.

Referring now to FIG. 7, a block diagram of a controller 700 for operating an electric machine is shown. The controller 700 provides pulse width modulation motor control for electric machine 126 and it provides for inputting D-axis current and Q-axis current. The controller 700 may be comprised at least in part of executable instructions stored in non-transitory memory of inverter system controller 134. Controller 700 may also include hardware such as power transistors, inductors, capacitors, etc. Further, controller 700 may receive input from the methods shown in FIGS. 10, 13, 16, and 19. In this example, electric machine 126 is a three phase induction machine that is supplied with electric power via inverter system controller 134. The amounts of electric current that are supplied in each of the three electric machine phases is input to block 720 where Park and Clark transforms convert the electric currents from each of the three phases into a measured quadrature or torque current $i_q$ and a measured magnetic flux current $i_d$. These electric currents may be applied as feedback.

A D-axis electric current pulse generator 704 may supply a pulsed current signal to inverse Park transform block 712. Similarly, a Q-axis electric current pulse generator 702 may supply a pulsed current signal to inverse Park transform block 712. The quadrature current $I_q$ command and the direct or flux current command $I_d$ are processed via an inverse Park transform into three individual phase voltages (Van, Vbn, and Vcn) at block 712. The phase voltages Van, Vbn, and Von are input to block 714.

At block 714, the three phase voltages are converted into phase pulses via space vector pulse width modulation. The pulses operate the transistors or switches in the inverter system controller 134. The power inverter 716 outputs voltages for each of the phase windings 751 of electric machine 126, which may cause rotor 752 to rotate. The position of rotor 752 is reported via rotor sensor 750 and the rotor angle is supplied to blocks 712 and 720 for the inverse Park transform and the Park and Clark transforms.

Figure 8:
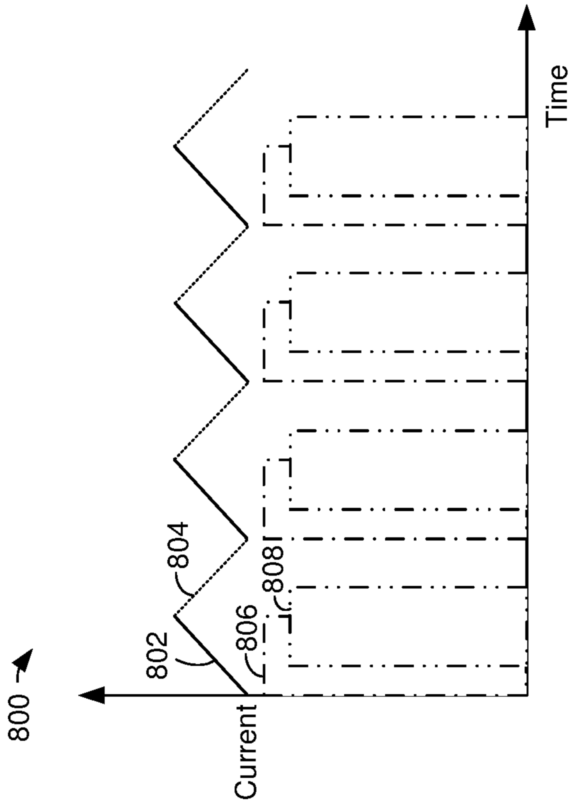
FIGS. 8 and 9 show signals for D-axis and Q-axis electric machine control.

Referring now to FIG. 8, a plot 800 that illustrates how D-axis current and Q-axis current may be controlled to leverage residual magnetic flux is shown. The left vertical axis represents D-axis and Q-axis current and the magnitude of D-axis and Q-axis current increases in the direction of the left vertical axis arrow. The right vertical axis represents electric machine rotor magnetic flux linkage and the magnitude of the electric machine rotor magnetic flux linkage increases in the direction of the right vertical axis arrow. The horizontal axis represents time and time increases from the left side of the plot to the right side of the plot. Dashed-dot line 806 represents D-axis current. Dashed-dot-dot line 808 represents Q-axis current. Solid line 802 represents induced magnetic flux generated from the D-axis current. Dashed line 804 represents residual magnetic flux. The D-axis and Q-axis currents are rectangular in shape or they may be square in shape.

Figure 9:
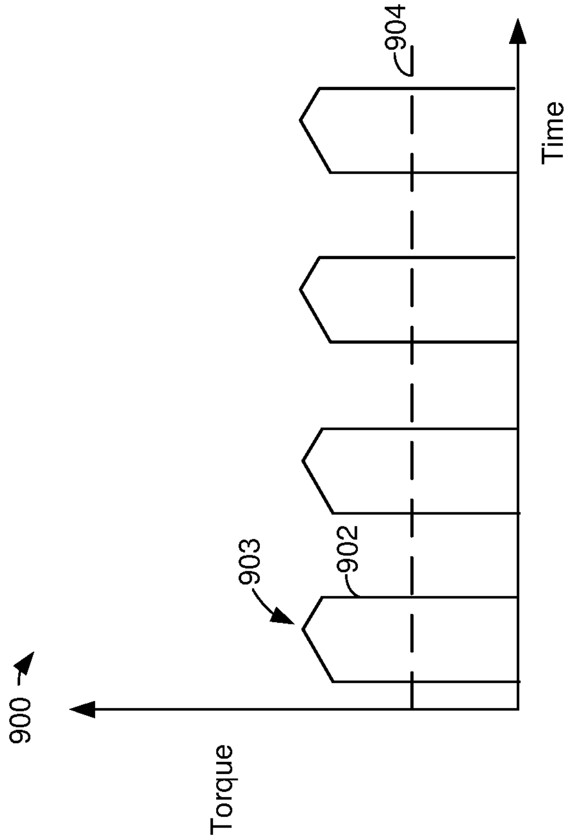

In FIG. 8, the Q-axis current is pulsed and the D-axis current is pulsed. The Q-axis current and the D-axis current may be pulsed via changing from a first current value to a second current value without providing intermediate level currents as shown in FIG. 21. The Q-axis and D-axis currents may be pulsed by changing from a first current output to a second current output in one time step of the device or controller that generates the pulses and then returning back to the first current output at a later time in a second time step of the device or controller. In this example, the Q-axis current is pulsed out of phase with the pulsed D-axis current. In particular, the pulsed Q-axis current lags the pulsed D-axis current in time, but since there is residual magnetic flux while the pulsed Q-axis current is present, torque may be produced via the electric machine as shown in FIG. 9. The phase adjustments may provide more precise tuning of electric machine torque than when D-axis current and Q-axis current pulses are aligned in time. The peak or maximum value of the pulsed Q-axis current and the maximum value of the pulsed D-axis current may be different as shown.

Referring now to FIG. 9, electric machine torque that is generated based on the pulsed D-axis current and the pulsed Q-axis current illustrated in FIG. 8 is shown. The vertical axis represents electric machine torque and electric machine torque increases in the direction of the vertical axis arrow. The horizontal axis represents time and time increases from the left side of the figure to the right side of the figure. Solid line 902 represents the pulsed torque that is generated by the electric machine based on the pulsed Q-axis and D-axis currents shown in FIG. 8. Dashed line 904 represents the average torque that is generated by the electric machine based on the pulsed Q-axis and D-axis currents shown in FIG. 8.

Thus, it may be observed that the pulsed torque output of the electric machine now features a sculpted top section 903 that has the effect of modifying the average torque output of the electric machine. This sculpted top section 903 may be adjusted via adjusting the phase timing of the pulsed Q-axis current and D-axis current.

Figure 10:
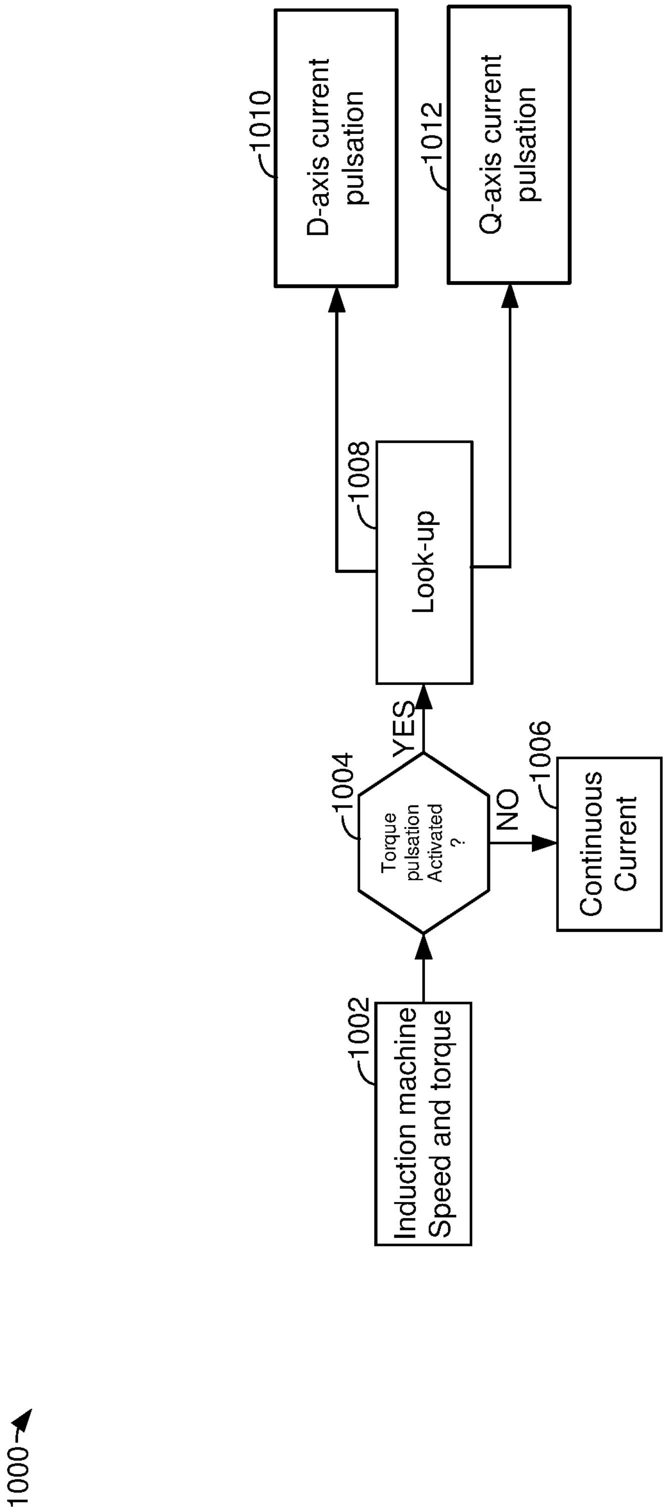
FIG. 10 shows a block diagram for D-axis and Q-axis electric machine control.

Referring now to FIG. 10, a block diagram 1000 of a method for generating pulsed D-axis current and pulsed Q-axis current is shown. The method that is represented by block diagram 1000 may be performed via the system of FIG. 1 in cooperation with the controllers and other methods described herein. Further, the method that is described by block diagram 1000 may be incorporated into one or more controllers as executable instructions that are stored in controller memory. The method may include adjusting sensors and actuators in the physical world to perform the method.

At block 1002, the method determines electric machine operating conditions. Operating conditions of the electric machine may be determined via electric machine sensors and the operating conditions are supplied to block 1004. The operating conditions may include but are not limited to electric machine speed, electric machine load, electric machine temperature, etc. The operating conditions are supplied to block 1004.

At block 1004, the method judges whether or not pulsed torque operation of the electric machine is to be performed. Pulsed torque operation may be enabled or activated when the electric machine is operating in a particular speed and load range (e.g., lower speeds and lower loads). If the method judges that pulsed torque operation of the electric machine is to be performed, the answer is yes and the method proceeds to 1008. Otherwise, the answer is no and the method proceeds to 1006.

At 1006, the method operates the electric machine in a continuous electric current mode where an electric current is continuously supplied to the electric machine and where electric current is not pulsed (e.g., supplying electric current to the electric machine at a first current level, moving the electric current supplied to the electric machine to a second current level without commanding and/or supplying current to the electric machine at intermediate current levels between the first current level and the second current level, and moving the electric current supplied to the electric machine back to the first level without commanding and/or supplying current to the electric machine at intermediate current levels between the second current level and the first current level). The method proceeds to exit.

At 1008, the method determines pulse magnitudes, frequency, duty cycle (e.g., portion of the period of the pulse signal where the pulse is at a higher level), and phase (e.g., timing of when the rising edge of the pulse signal occurs and timing of when the falling edge of the pulse occurs relative to timing of rising and falling edges of other signals) of D-axis and Q-axis current pulse signals. The method outputs the D-axis current pulses at block 1010. The method outputs the Q-axis current pulses at block 1012. The D-axis and Q-axis current pulsations may be generated via changing values of variables stored in memory and/or changing physical signals that represent D-axis current and Q-axis current. In one example, the method references a table via electric machine speed and load. The table outputs pulse frequency for D-axis and Q-axis current pulses. The magnitude, duty cycles, and phase may be determined in a similar way.

Thus, the method of FIG. 10 may generate D-axis current command pulsed signals and Q-axis current command pulsed signals as shown in FIG. 8. These signals may be delivered to the controller that is shown in FIG. 7 to operate the electric machine at higher efficiency levels and with lower electric machine noise and vibration.

Figure 11:
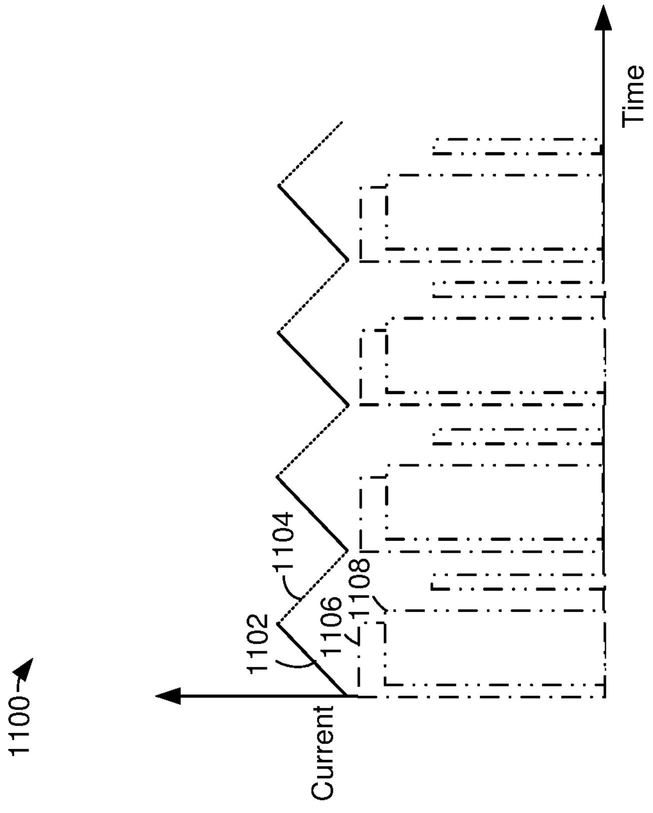
FIGS. 11 and 12 show signals for modified D-axis and Q-axis electric machine control.

Referring now to FIG. 11, a plot that illustrates how D-axis current and Q-axis current may be controlled to leverage residual magnetic flux is shown. The left vertical axis represents D-axis and Q-axis current and the magnitude of D-axis and Q-axis current increases in the direction of the left vertical axis arrow. The right vertical axis represents electric machine rotor magnetic flux linkage and the magnitude of the electric machine rotor magnetic flux linkage increases in the direction of the right vertical axis arrow. The horizontal axis represents time and time increases from the left side of the plot to the right side of the plot. Dashed-dot line 1106 represents D-axis current. Dashed-dot-dot line 1108 represents Q-axis current. Solid line 1102 represents induced magnetic flux generated from the D-axis current. Dashed line 1104 represents residual magnetic flux.

Figure 12:
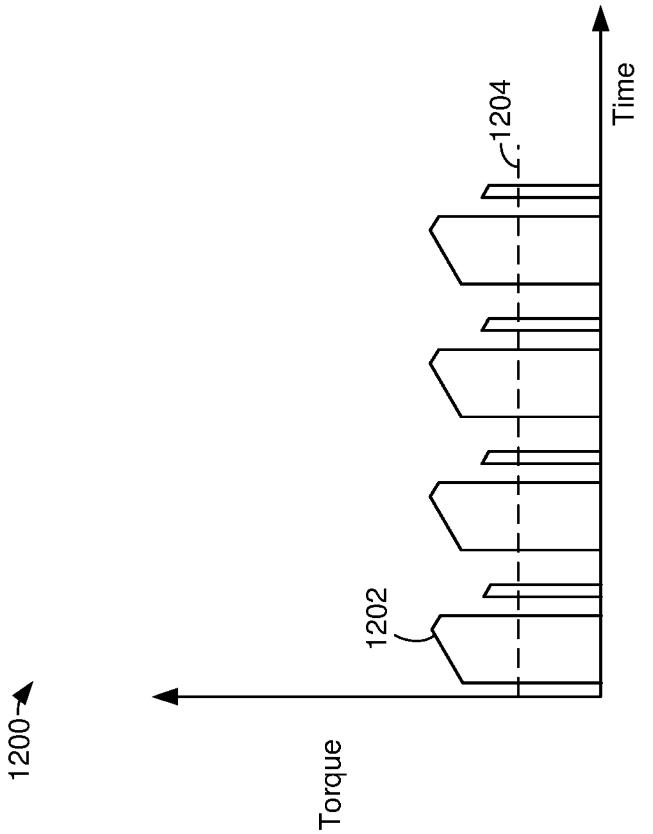

In FIG. 11, the Q-axis current is twice pulsed during a period of the D-axis current signal and the D-axis current is pulsed once during the period of the D-axis signal. This may allow the electric machine torque output to be fine-tuned as compared to single pulsing of Q-axis current as shown in FIG. 8. The Q-axis and D-axis currents may be pulsed by changing from a first current output to a second current output in one time step of the device or controller that generates the pulses and then returning back to the first current output in a second time step of the device or controller. In this example, the Q-axis current is pulsed out of phase with the D-axis current and twice during a period of the D-axis current. The pulsed Q-axis current lags the pulsed D-axis current in time, but since there is residual magnetic flux while both Q-axis current pulses are present, torque may be produced via the electric machine as shown in FIG. 12. The peak or maximum values of the two Q-axis current pulses and the maximum value of the pulsed D-axis current may be different as shown.

Referring now to FIG. 12, electric machine torque that is generated based on the pulsed D-axis current and the pulsed Q-axis current illustrated in FIG. 11 is shown. The vertical axis represents electric machine torque and electric machine torque increases in the direction of the vertical axis arrow. The horizontal axis represents time and time increases from the left side of the figure to the right side of the figure. Solid line 1202 represents the pulsed torque that is generated by the electric machine based on the pulsed Q-axis and D-axis currents shown in FIG. 11. Dashed line 1204 represents the average torque that is generated by the electric machine based on the pulsed Q-axis and D-axis currents shown in FIG. 11.

Thus, it may be observed that the pulsed torque output of the electric machine now features a sculpted top section 1203 that has the effect of modifying the average torque output of the electric machine. This sculpted top section 1203 may be adjusted via adjusting the phase of the pulsed Q-axis current and D-axis current as well as the actual total number of Q-axis current pulses.

Figure 13:
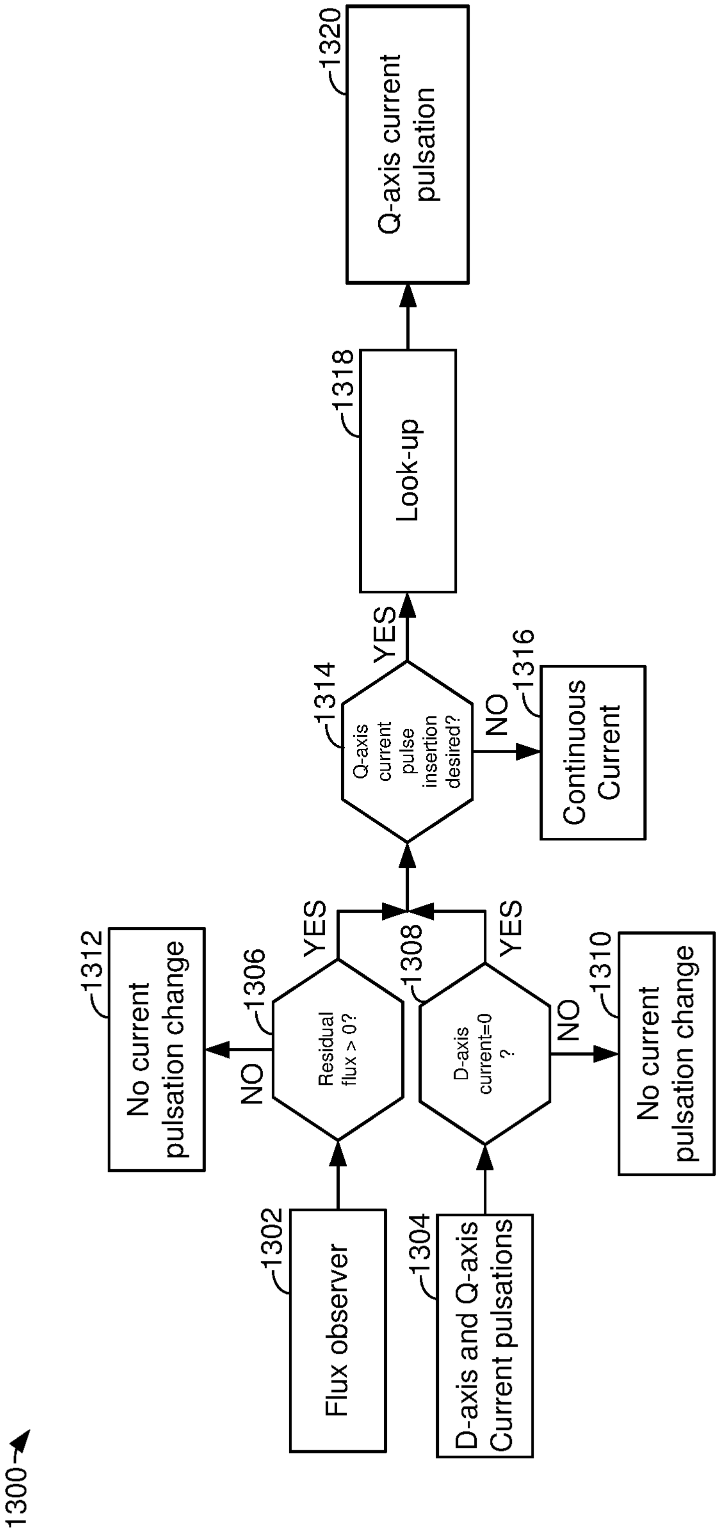
FIG. 13 shows a block diagram for D-axis and Q-axis electric machine control where an additional control pulse is provided.

Referring now to FIG. 13, a block diagram 1300 of a method for generating pulsed D-axis current and multi-pulsed Q-axis current is shown. The method that is represented by block diagram 1100 may be performed via the system of FIG. 1 in cooperation with the controllers and other methods described herein. Further, the method that is described by block diagram 1300 may be incorporated into one or more controllers as executable instructions that are stored in controller memory. The method may include adjusting sensors and actuators in the physical world to perform the method.

At block 1302, the method applies a magnetic flux observer to provide an estimate of magnetic flux that is present within the rotor of the electric machine. The observer may include a model of the electric machine that outputs an amount of residual magnetic flux that is in the rotor of the electric machine. The amount of residual magnetic flux is output to block 1306.

At block 1304, the method receives D-axis current and Q-axis current requests or commands. The D-axis and Q-axis current commands may be generated via the method of FIG. 10 or via another method. The D-axis and Q-axis current requests or commands are output to block 1308.

At block 1306, the method judges whether or not the amount of residual magnetic flux in the rotor is greater than zero. If the method judges that the amount of residual flux is greater than zero, the answer is yes and the method proceeds to 1314. Otherwise, the answer is no and the method proceeds to 1312.

At block 1308, the method judges whether or not the amount of D-axis current is zero. If the method judges that the amount of D-axis current is zero, the answer is yes and the method proceeds to 1314. Otherwise, the answer is no and the method proceeds to 1310.

At 1312, the method performs no changes to the D-axis current or the Q-axis current request. Thus, the D-axis current request signal and the Q-axis current request signal are passed on to the electric machine controller (e.g., 700 of FIG. 7) unchanged.

At 1310, the method performs no changes to the D-axis current or the Q-axis current request. Thus, the D-axis current request signal and the Q-axis current request signal are passed on to the electric machine controller (e.g., 700 of FIG. 7) unchanged.

At 1314, the method judges whether or not insertion of a second Q-axis current pulse during a period of the pulsed D-axis current request signal is desired. The method may judge that a second Q-axis current pulse during the period of the pulsed D-axis current request is desired based on electric machine speed and load. Further, in some examples, the method may judge that a second Q-axis current pulse during the period of the pulsed D-axis current request is desired based on output of a vibration sensor that measures vibration of the electric machine. For example, if output of the vibration sensor is greater than a second threshold, a second Q-axis current pulse during a period of pulsed D-axis current may be desired. If the method judges that a second Q-axis current pulse during a period of the pulsed D-axis current request signal is desired, the answer is yes and the method proceeds to 1318. Otherwise, the answer is no and the method proceeds to 1316.

At 1316, the method requests a continuous torque and does not pulse the torque request. The method proceeds to exit.

At 1318, the method determines timing for inserting an additional or second pulse into the Q-axis current pulsing signal such that the Q-axis current request signal includes two pulses during a period of the D-axis current pulse request signal. The second pulse may be inserted into the Q-axis current pulsing signal as shown in FIG. 11. Further, the amplitude and or the timing (e.g., phase of the second pulse with respect to the D-axis current pulse) may be adjusted responsive to output of a vibration sensor, or alternatively, in response to an inference of electric machine vibration as determined via an electric machine speed or position sensor. The method modifies the Q-axis current pulsing signal and outputs the adjusted signal at block 1320. The Q-axis current pulsing signal may be manifest as a value of a variable that is stored in controller memory or a physical current signal that is adjusted via hardware (e.g., transistors, etc.). The method exits after revising the Q-axis current pulsing request or command. The method does not modify the D-axis current pulsing request or command.

Thus, the method of FIG. 13 may generate a Q-axis current pulse command or request signal that includes two pulses during a period of a D-axis current pulse so that additional torque compensation may be provided. The additional torque compensation may operate to reduce electric machine noise and vibration.

Figure 14:
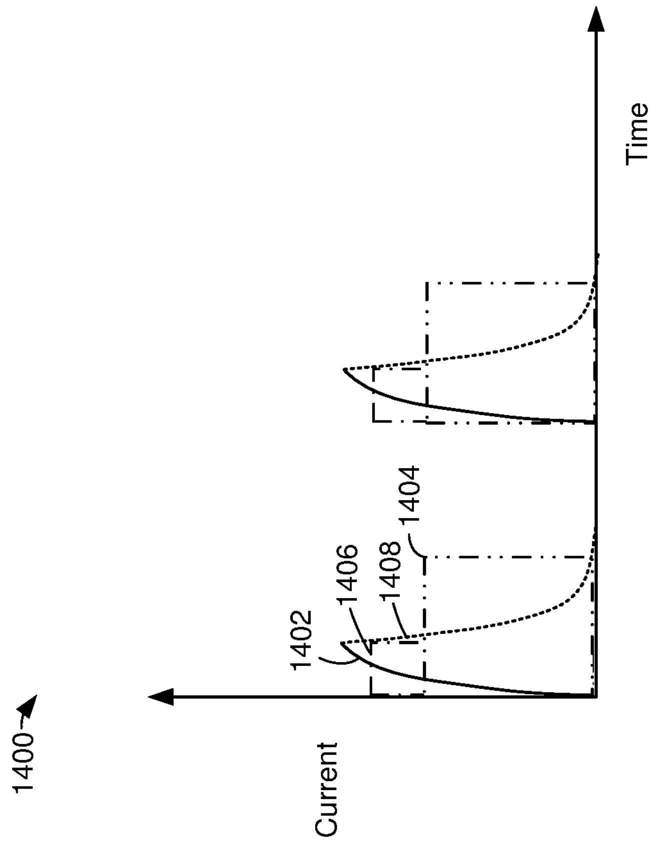

Referring now to FIG. 14, a plot that illustrates how D-axis current and Q-axis current may be controlled to leverage the total magnetic flux during a period of a D-axis current pulse request or command is shown. The left vertical axis represents D-axis and Q-axis current and the magnitude of D-axis and Q-axis current increases in the direction of the left vertical axis arrow. The right vertical axis represents electric machine rotor magnetic flux linkage and the magnitude of the electric machine rotor magnetic flux linkage increases in the direction of the right vertical axis arrow. The horizontal axis represents time and time increases from the left side of the plot to the right side of the plot. Dashed-dot line 1406 represents D-axis current. Dashed-dot-dot line 1408 represents Q-axis current. Solid line 1402 represents induced magnetic flux generated from the D-axis current. Dashed line 1404 represents residual magnetic flux.

In FIG. 14, the Q-axis current pulse is extended from the rising edge of the Q-axis pulse to a time in the period of the D-axis current where the residual magnetic flux is reduced from a non-zero value to a value of zero. This allows the electric machine to generate additional torque as compared to if the Q-axis current pulse is the same pulse width as the D-axis current pulse. Adjusting the Q-axis current pulse in this way allows electric machine torque to be adjusted as shown in FIG. 15.

Figure 15:
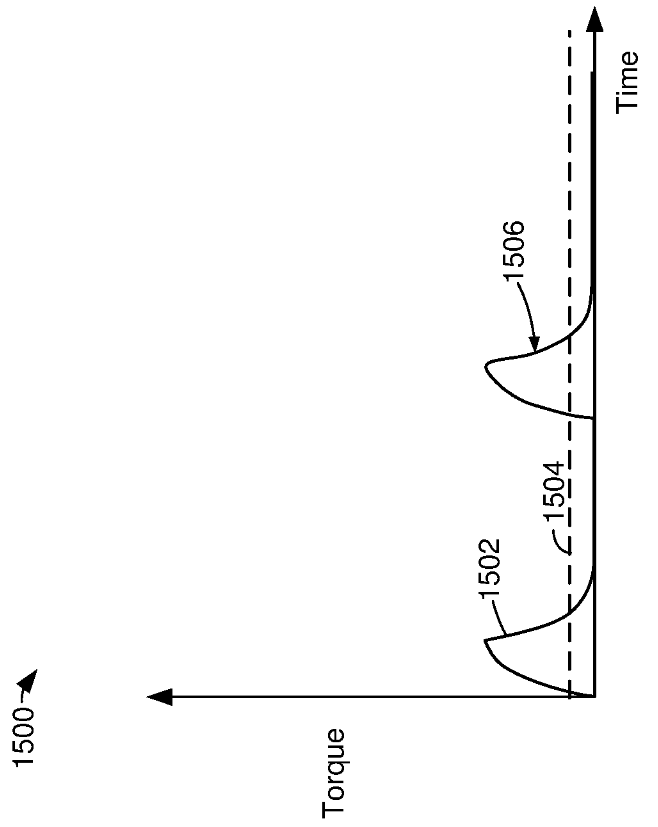
FIGS. 14 and 15 show signals for D-axis and Q-axis electric machine control that is based on magnetic flux of an electric machine.

Referring now to FIG. 15, electric machine torque that is generated based on the pulsed D-axis current and the pulsed Q-axis current illustrated in FIG. 14 is shown. The vertical axis represents electric machine torque and electric machine torque increases in the direction of the vertical axis arrow. The horizontal axis represents time and time increases from the left side of the figure to the right side of the figure. Solid line 1502 represents the pulsed torque that is generated by the electric machine based on the pulsed Q-axis and D-axis currents shown in FIG. 14. Dashed line 1504 represents the average torque that is generated by the electric machine based on the pulsed Q-axis and D-axis currents shown in FIG. 14.

Thus, it may be observed that the torque output of the electric machine now features an extended decay torque section 1506 that has the effect of increasing the average torque output of the electric machine. The decay rate of section 1506 may be adjusted via adjusting the timing of the falling edge of the pulsed Q-axis current request or command.

Figure 16:
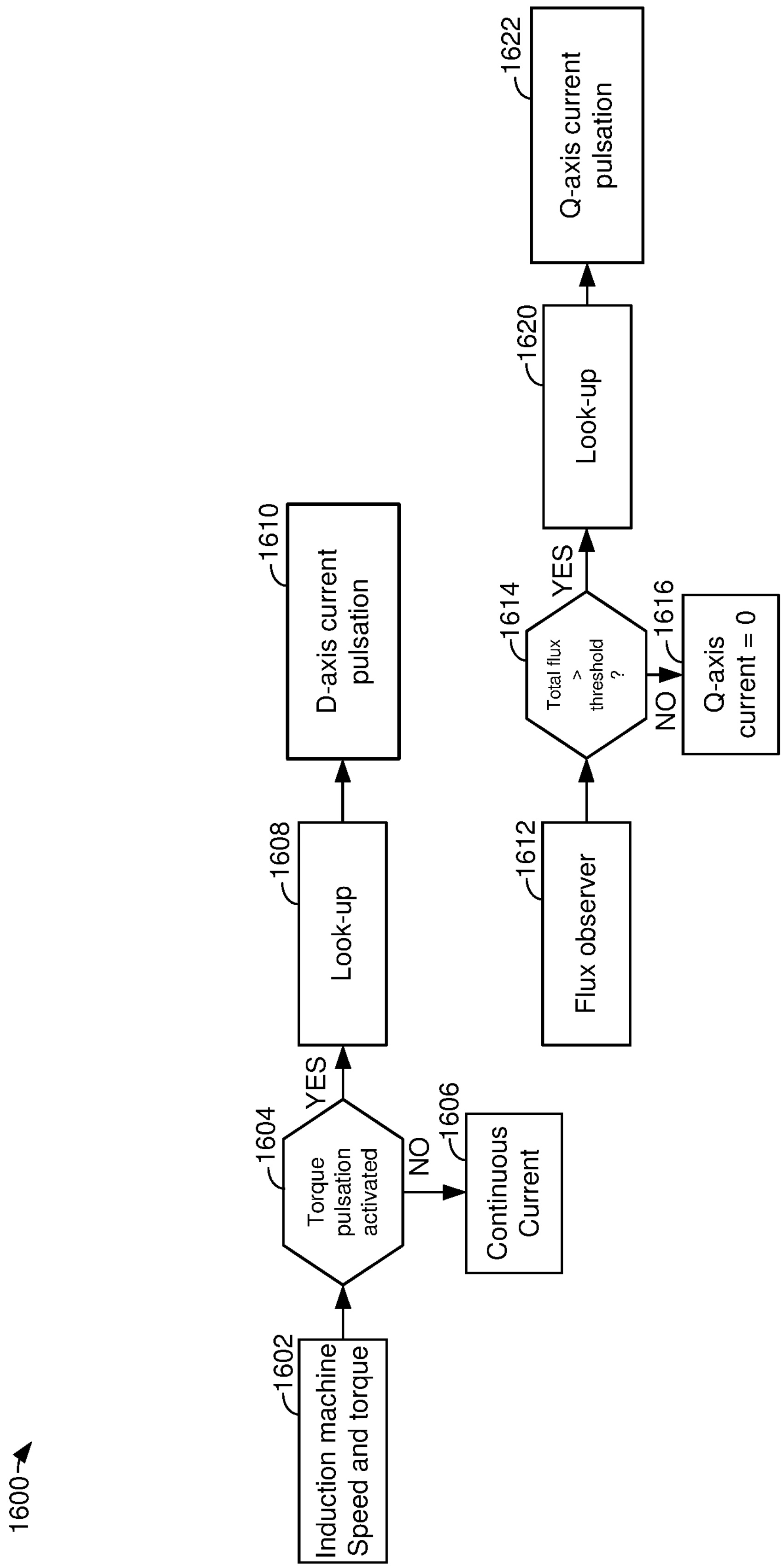
FIG. 16 shows a block diagram for D-axis and Q-axis electric machine control where compensation for magnetic flux is provided.

Referring now to FIG. 16, a block diagram 1600 of a method for utilizing an actual total amount of magnetic flux (e.g., induced magnetic flux plus residual magnetic flux) is shown. The method that is represented by block diagram 1600 may be performed via the system of FIG. 1 in cooperation with the controllers and other methods described herein. Further, the method that is described by block diagram 1600 may be incorporated into one or more controllers as executable instructions that are stored in controller memory. The method may include adjusting sensors and actuators in the physical world to perform the method.

At block 1302, the method determines electric machine operating conditions. Operating conditions of the electric machine may be determined via electric machine sensors and the operating conditions are supplied to block 1004. The operating conditions may include but are not limited to electric machine speed, electric machine load, electric machine temperature, etc. The operating conditions are supplied to block 1604.

At block 1604, the method judges whether or not pulsed torque operation of the electric machine is to be performed. Pulsed torque operation may be enabled or activated when the electric machine is operating in a particular speed and load range (e.g., lower speeds and lower loads). If the method judges that pulsed torque operation of the electric machine is to be performed, the answer is yes and the method proceeds to 1608. Otherwise, the answer is no and the method proceeds to 1606.

At 1606, the method operates the electric machine in a continuous electric current mode where an electric current is continuously supplied to the electric machine and where electric current is not pulsed (e.g., supplying electric current to the electric machine at a first current level, moving the electric current supplied to the electric machine to a second current level without commanding and/or supplying current to the electric machine at intermediate current levels between the first current level and the second current level, and moving the electric current supplied to the electric machine back to the first level without commanding and/or supplying current to the electric machine at intermediate current levels between the second current level and the first current level). The method proceeds to exit.

At 1608, the method determines pulse magnitudes, frequency, duty cycle (e.g., portion of the period of the pulses where the pulse is at a higher level), and phase (e.g., timing of when the rising edge of the pulse signal occurs and timing of when the falling edge of the pulse occurs relative to timing of rising and falling edges of other signals) of D-axis current pulse signal. The method outputs the D-axis current pulses at block 1610. The D-axis current pulse signals may be generated via changing values of variables stored in memory and/or changing physical signals that represent D-axis current. In one example, the method references a table via electric machine speed and load. The table outputs pulse frequency for D-axis current pulses. The magnitude, duty cycles, and phase may be determined in a similar way.

At block 1612, the method applies a magnetic flux observer to provide an estimate of magnetic flux that is present within the rotor of the electric machine. The observer may include a model of the electric machine that outputs an amount of residual magnetic flux that is in the rotor of the electric machine. The amount of residual magnetic flux is output to block 1614.

At block 1614, the method judges whether or not the amount of residual magnetic flux in the rotor is greater than zero. If the method judges that the amount of residual flux is greater than zero, the answer is yes and the method proceeds to 1620. Otherwise, the answer is no and the method proceeds to 1616.

At 1616, the method adjusts the Q-axis current request to zero. The method exits after block 1616 is performed.

At 1620, the method determines timing for the Q-axis current pulsing signal. The Q-axis current determines timing for the Q-axis current pulses that are output within the same period as the D-axis current pulses are output. In one example, the Q-axis current pulse width that occurs during a period of the D-axis current pulse is adjusted in response to the actual total amount of magnetic flux. For example, as shown in FIG. 14, the Q-axis current pulse may end at the time that the total magnetic flux reaches zero after most recently being a non-zero value. However, the Q-axis current pulse may end earlier than the time that the total magnetic flux reaches zero based on electric machine noise and vibration levels. The Q-axis current pulse commands or requests are output to an electric machine controller (e.g., 700 of FIG. 7) that adjusts operation of the inverter to control the electric machine.

Thus, the method of FIG. 16 may modify Q-axis current pulse timing to take advantage of residual magnetic flux in the rotor so that electric machine torque may be produced over a greater portion of the period of the D-axis current pulse. Consequently, noise and vibration generated via an electric machine may be reduced.

Figure 17:
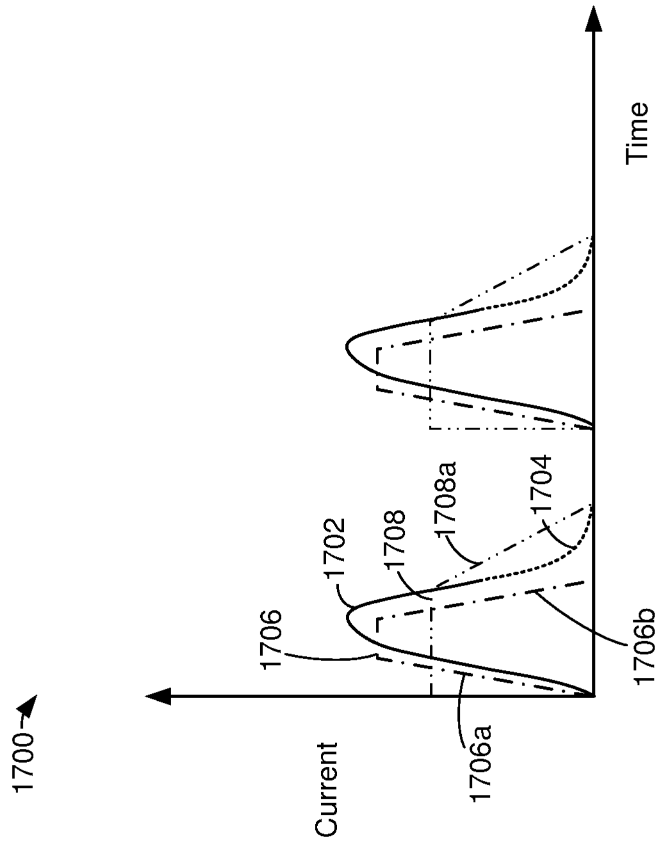

Referring now to FIG. 17, a plot that illustrates how D-axis current and Q-axis current pulses may be modified to shape electric machine torque. The left vertical axis represents D-axis and Q-axis current and the magnitude of D-axis and Q-axis current increases in the direction of the left vertical axis arrow. The right vertical axis represents electric machine rotor magnetic flux linkage and the magnitude of the electric machine rotor magnetic flux linkage increases in the direction of the right vertical axis arrow. The horizontal axis represents time and time increases from the left side of the plot to the right side of the plot. Dashed-dot line 1706 represents D-axis current. Dashed-dot-dot line 1708 represents Q-axis current. Solid line 1702 represents induced magnetic flux generated from the D-axis current. Dashed line 1704 represents residual magnetic flux.

In FIG. 17, the D-axis current pulse is modified to include ramped rising edge 1706*a* and ramped falling edge 1706*b*. The Q-axis current pulse is modified to have a ramped falling edge 1708*a*. The pulse shaping provides an additional way to shape electric machine torque so that electric machine noise and vibration may be reduced.

Figure 18:
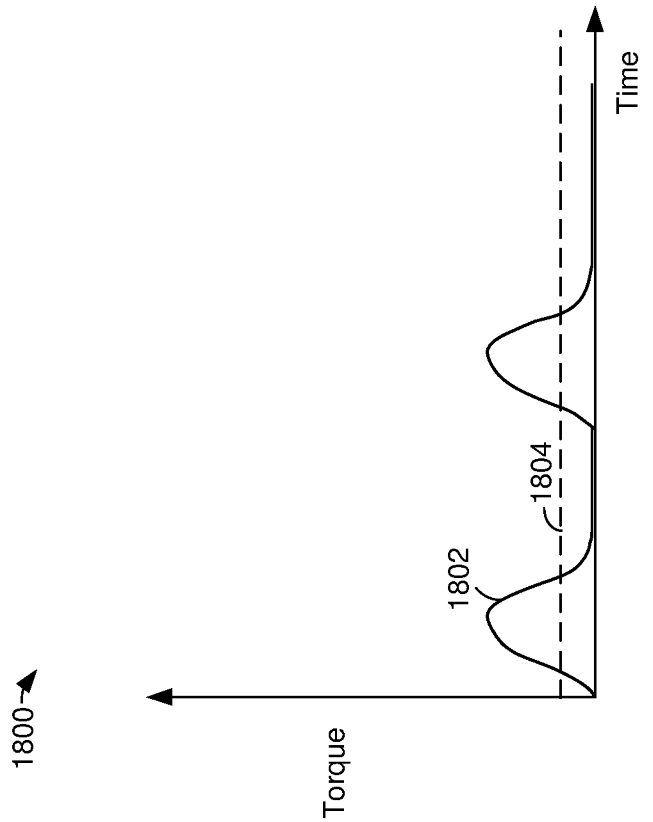
FIGS. 17 and 18 show signals for D-axis and Q-axis electric machine control that is based on shaped electric machine current control.

Referring now to FIG. 18, electric machine torque that is generated based on the pulsed D-axis current and the pulsed Q-axis current illustrated in FIG. 17 is shown. The vertical axis represents electric machine torque and electric machine torque increases in the direction of the vertical axis arrow. The horizontal axis represents time and time increases from the left side of the figure to the right side of the figure. Solid line 1802 represents the pulsed torque that is generated by the electric machine based on the pulsed Q-axis and D-axis currents shown in FIG. 14. Dashed line 1804 represents the average torque that is generated by the electric machine based on the pulsed Q-axis and D-axis currents shown in FIG. 17.

Thus, it may be observed that the torque output of the electric machine now features a slower rate of rise and a slower rate of decay as compared to the other pulsed D-axis and Q-axis currents. These slower rates of rise and rates of decay may be beneficial to smooth electric machine torque generation.

Figure 19:
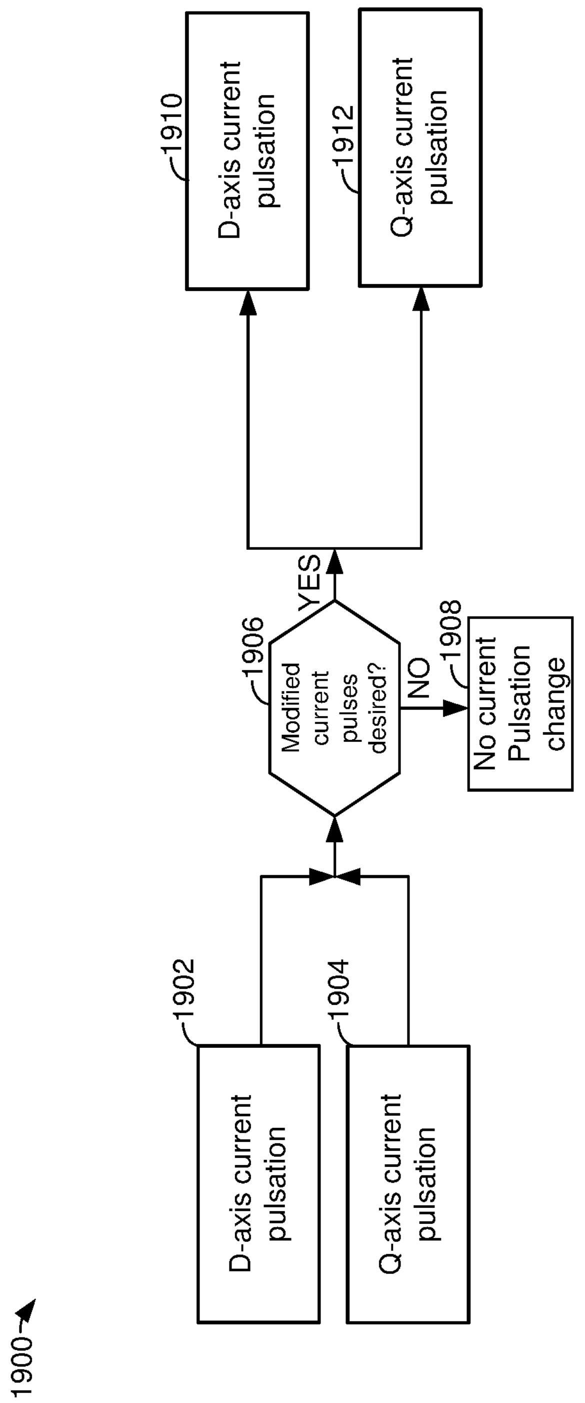
FIG. 19 shows a block diagram for D-axis and Q-axis electric machine shaped current control.

Referring now to FIG. 19, a block diagram 1900 of a method for modifying D-axis and Q-axis torque pulses is shown. The method that is represented by block diagram 1900 may be performed via the system of FIG. 1 in cooperation with the controllers and other methods described herein. Further, the method that is described by block diagram 1900 may be incorporated into one or more controllers as executable instructions that are stored in controller memory. The method may include adjusting sensors and actuators in the physical world to perform the method.

At block 1902, intercepts D-axis current pulse requests or commands. Similarly, Q-axis current pulse requests or commands are intercepted at 1904. These current pulses may be generated as discussed in the description of FIG. 10. The D-axis and Q-axis current pulse requests or commands are delivered to block 1904.

At block 1904, the method judges whether or not modified current pulse are desired. In one example, modified D-axis and Q-axis current pulses may be desired when electric machine noise and/or vibration exceed their respective thresholds. Alternatively, or in addition, modified D-axis and Q-axis current pulses may be desired when electric machine speed and load are within a predefined range. If the method judges that modified D-axis and Q-axis pulses are desired, the answer is yes the method proceeds to 1910 and 1912. Otherwise, the method proceeds to 1908. At 1908, the method performs no modification to the D-axis and Q-axis current pulse requests or commands. The method proceeds to exit.

At 1910, the method modifies the D-axis current pulses. The rising edge of the D-axis current pulse may be ramped up or incrementally increased as shown in FIG. 17. The falling edge of the D-axis current may be ramped down or incrementally decreased as shown in FIG. 17. The method outputs the modified D-axis current pulse to the electric machine controller and the electric machine controller operates the electric machine according to the modified D-axis current pulses.

At 1912, the method modifies the Q-axis current pulses. The rising edge of the Q-axis current pulse may be ramped up or incrementally increased as shown in FIG. 17. The falling edge of the Q-axis current may be ramped down or incrementally decreased as shown in FIG. 17. The method outputs the modified Q-axis current pulse to the electric machine controller and the electric machine controller operates the electric machine according to the modified Q-axis current pulses.

Thus, the method of FIG. 19 may modify Q-axis and D-axis current pulse timings to make further adjustments to smooth electric machine torque and reduce electric machine noise and vibration.

The methods described herein provide for a method for operating an electric drive system, comprising: supplying a pulsed magnetic flux current command signal and a pulsed torque current command signal to an electric machine controller, where the pulsed magnetic flux current command signal has timing different from the pulsed torque current command signal. In a first example, the method includes where the pulsed magnetic flux current command signal begins earlier in time than the pulsed torque current command signal. In a second example that may include the first example, the method includes where an amplitude of the pulsed magnetic flux current command signal is greater than an amplitude of the pulsed torque current command signal. In a third example that may include one or both of the first and second examples, the method further comprises operating an electric machine via the pulsed magnetic flux current command signal and the pulsed torque current command signal. In a fourth example that may include one or more of the first through third examples, the method includes where the pulsed magnetic flux current command signal has timing different from the pulsed torque current command signal includes different pulse starting times and different pulse ending times. In a fifth example that may include one or more of the first through fourth examples, the method includes where the pulsed magnetic flux current command signal and the pulsed torque current command signal are determined via look-up tables. In a sixth example that may include one or more of the first through fifth examples, the method further comprises adjusting the pulsed torque current command signal in response to a magnetic flux of an electric machine of the electric drive system. In a seventh example that may include one or more of the first through sixth examples, the method includes where adjusting the pulsed torque current command signal includes increasing a duration of the pulsed torque current command signal in response to the magnetic flux being greater than zero.

The methods also provide for a method for operating an electric drive system, comprising: supplying a pulsed magnetic flux current command signal and a pulsed torque current command signal to an electric machine controller, where the pulsed magnetic flux current command signal has timing different from the pulsed torque current command signal, and where the pulsed magnetic flux current command signal is adjusted based on a total amount of magnetic flux. In a first example, the method includes where the total amount of magnetic flux is a sum of an induced magnetic flux amount and a residual magnetic flux amount. In a second example that may include the first example, the method includes where the pulsed torque current command signal is adjusted from a non-zero value to a value of zero beginning from a time when the total amount of magnetic flux is non-zero. In a third example that may include one or both of the first and second examples, the method includes where the pulsed torque current command signal is adjusted to a value of zero at a same time the total amount of magnetic flux reaches a value of zero from a non-zero value. In a fourth example that may include one or more of the first through third examples, the method includes where the pulsed torque current command signal includes two pulses during a period of the pulsed magnetic flux current command signal.

Referring now to FIG. 20, shows how an example pulsed D-axis current request may be generated. Plot 2000 includes a vertical axis and a horizontal axis. The vertical axis represents a D-axis current request value (e.g., 0-100 Amperes) and the D-axis current request value increases in the direction of the vertical axis arrow. The horizontal axis represents time and time increases from the left side of the figure to the right side of the figure.

In this example, the pulsed D-axis current request is either one of two values. Namely, the D-axis current request value is zero or Chigh. The pulsed D-axis current request value may be comprised of individual values that are indicated via dots that are similar to dot 2002. The line 2010 that links the dots is provided for visualizing the plot, not to indicate that there are any intermediate torque values between 0 and Chigh because there are none. These individual values may be updated at a predetermined rate (e.g., a control module execution loop time) via the controller to permit generation of a pulsed D-axis current request at a desired frequency.

Referring now to FIG. 21, a plot that shows a D-axis and a Q-axis is shown. The D-axis and Q-axis are used to facilitate vector or field oriented control of the electric machine (e.g., an induction machine). In FIG. 21, the D-axis 2105 and the Q-axis 2106 are superimposed on a three-phase induction electric machine 2100. The D-axis is aligned with the electric machine's rotor field flux 2110 and the Q-axis is perpendicular to the D-axis. The rotor is indicated at 2120. The phase windings are indicated as A, B, and C.

Note that the example control and estimation routines included herein can be used with various induction electric machine configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as eventdriven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various system hardware components in combination with one or more controllers.

This concludes the description. The reading of it by those skilled in the art would bring to mind many alterations and modifications without departing from the spirit and the scope of the description. For example, the system and method may be applied to single phase or multi-phase (e.g., three phase) induction electric machines.

The invention claimed is:

1. A method for operating an electric drive system with an induction machine, comprising:

supplying a pulsed magnetic flux current command signal and a pulsed torque current command signal to an electric machine controller, where the pulsed magnetic flux current command signal has timing different from the pulsed torque current command signal, where the different timing includes different pulse starting times and different pulse ending times, where the pulsed magnetic flux current command signal induces magnetic flux in a rotor of the induction machine, and where the pulsed magnetic flux current command signal and the pulsed torque current command signal each periodically transition between zero and a non-zero value.

2. The method of claim 1, where the pulsed magnetic flux current command signal begins earlier in time than the pulsed torque current command signal, where the pulsed magnetic flux current command signal induces magnetic flux in the rotor of the induction machine, and where residual magnetic flux remains in the rotor after the pulsed magnetic flux current command signal returns to zero.

3. The method of claim 1, where an amplitude of the pulsed magnetic flux current command signal is greater than an amplitude of the pulsed torque current command signal.

4. The method of claim 1, further comprising operating an electric machine via the pulsed magnetic flux current command signal and the pulsed torque current command signal.

5. The method of claim 1, where the pulsed magnetic flux current command signal has timing different from the pulsed torque current command signal includes different pulse starting times and different pulse ending times.

6. The method of claim 1, where the pulsed magnetic flux current command signal and the pulsed torque current command signal are determined via look-up tables.

7. The method of claim 1, further comprising adjusting the pulsed torque current command signal in response to a residual magnetic flux of the induction machine remains in the rotor of the induction machine after the pulsed magnetic flux current command signal transitions to zero.

8. The method of claim 7, where adjusting the pulsed torque current command signal includes increasing a duration of the pulsed torque current command signal such that the pulsed torque current command signal extends beyond a pulse ending time of the pulsed magnetic flux current command signal and ends when the residual magnetic flux decays to zero.

9. A system, comprising:

an electric drive system including an inverter and an induction electric machine; and one or more controllers including executable instructions stored in non-transitory memory that cause the one or more controllers to generate a pulsed magnetic flux current command signal and a pulsed torque current command signal, where a duration of the pulsed magnetic flux current command signal is shorter than a duration of the pulsed torque current command signal, where a timing of the pulsed magnetic flux current command signal is different than the pulsed torque current command signal, where the pulsed magnetic flux current command signal induces magnetic flux in a rotor of the induction electric machine, and where the pulsed magnetic flux current command signal and the pulsed torque current command signal each periodically transition between zero and a non-zero value.

10. The system of claim 9, where the pulsed magnetic flux current command signal is zero during a portion of a period of the pulsed magnetic flux current command signal.

11. The system of claim 9, where the pulsed torque current command signal is zero during a portion of a period of the pulsed torque current command signal.

12. The system of claim 9, where an amplitude of the pulsed magnetic flux current command signal is greater than an amplitude of the pulsed torque current command signal.

13. The system of claim 12, further comprising additional instructions to generate a second pulsed torque current command signal during a period of the pulsed torque current command signal.

14. The system of claim 13, where the second pulsed torque current command signal is delivered to or generated by the one or more controllers when the pulsed magnetic flux current command signal is a value of zero, and where the second pulsed torque current command signal generates torque via the induction electric machine using residual magnetic flux that remains in the rotor of the induction electric machine after the pulsed magnetic flux current command signal transitions to zero.

15. The system of claim 9, further comprising supplying electric current to an induction machine in response to the pulsed magnetic flux current command signal and the pulsed torque current command signal.

16. A method for operating an electric drive system, comprising:

supplying a pulsed magnetic flux current command signal and a pulsed torque current command signal to an electric machine controller, where the pulsed magnetic flux current command signal has timing different from the pulsed torque current command signal, and where the pulsed magnetic flux current command signal is adjusted based on a total amount of magnetic flux, where the different timing includes different pulse starting times and different pulse ending times, where the pulsed magnetic flux current command signal induces magnetic flux in a rotor of an induction machine of the electric drive system, and where the pulsed magnetic flux current command signal and the pulsed torque current command signal each periodically transition between zero and a non-zero value.

17. The method of claim 16, where the total amount of magnetic flux is a sum of an induced magnetic flux amount and a residual magnetic flux amount.

18. The method of claim 17, where the pulsed torque current command signal is adjusted from a non-zero value to a value of zero beginning from a time when the total amount of magnetic flux is non-zero.

19. The method of claim 17, where the pulsed torque current command signal is adjusted to a value of zero at a same time the total amount of magnetic flux reaches zero from a non-zero value.

20. The method of claim 16, where the pulsed torque current command signal includes two pulses during a period of the pulsed magnetic flux current command signal, and where a second pulse of the two pulses occurs when the pulsed magnetic flux current command signal is zero and while residual magnetic flux in the rotor of an induction machine of the electric drive system is greater than zero.

* * * * *